United States Patent [19]

Thurlow

[11] Patent Number: 4,967,327

[45] Date of Patent: Oct. 30, 1990

[54] POTRACK LIGHT FIXTURE

[76] Inventor: Heida L. Thurlow, 10814 Riverview, Houston, Tex. 77043

[21] Appl. No.: 466,064

[22] Filed: Jan. 16, 1990

[51] Int. Cl.⁵ .............................................. F21V 21/00
[52] U.S. Cl. .................................... 362/249; 362/147; 362/404
[58] Field of Search ................ 362/249, 250, 404, 147

[56] References Cited

U.S. PATENT DOCUMENTS 3,003,055 10/1961 Liberman ............................. 362/249
4,688,154 8/1987 Nilssen ................................. 362/404
4,862,336 8/1989 Richardson et al. ................ 362/147

Primary Examiner—Carroll B. Dority
Attorney, Agent, or Firm—Weil, Gotshal & Manges

[57] ABSTRACT

The present invention is a combination potrack-light fixture designed to be suspended over a kitchen work area.

2 Claims, 4 Drawing Sheets

POTRACK LIGHT FIXTURE

Potracks have been for some years a common feature in kitchens. They are a convenient storage device for pots, pans and the like, which are removably suspended from the potracks by hooks. Potracks often are constructed to have grid-like structures so that hooks can be attached at numerous locations in a two-dimensional plane above the work area.

In addition to storage, proper and sufficient task lighting is especially important in home areas like kitchens. The present invention integrates the storage and task lighting needs of kitchens into a single appliance which provides at the same time functionality, convenience and esthetic design.

Details of the invention will appear from the drawings, in which.

Figure 1:
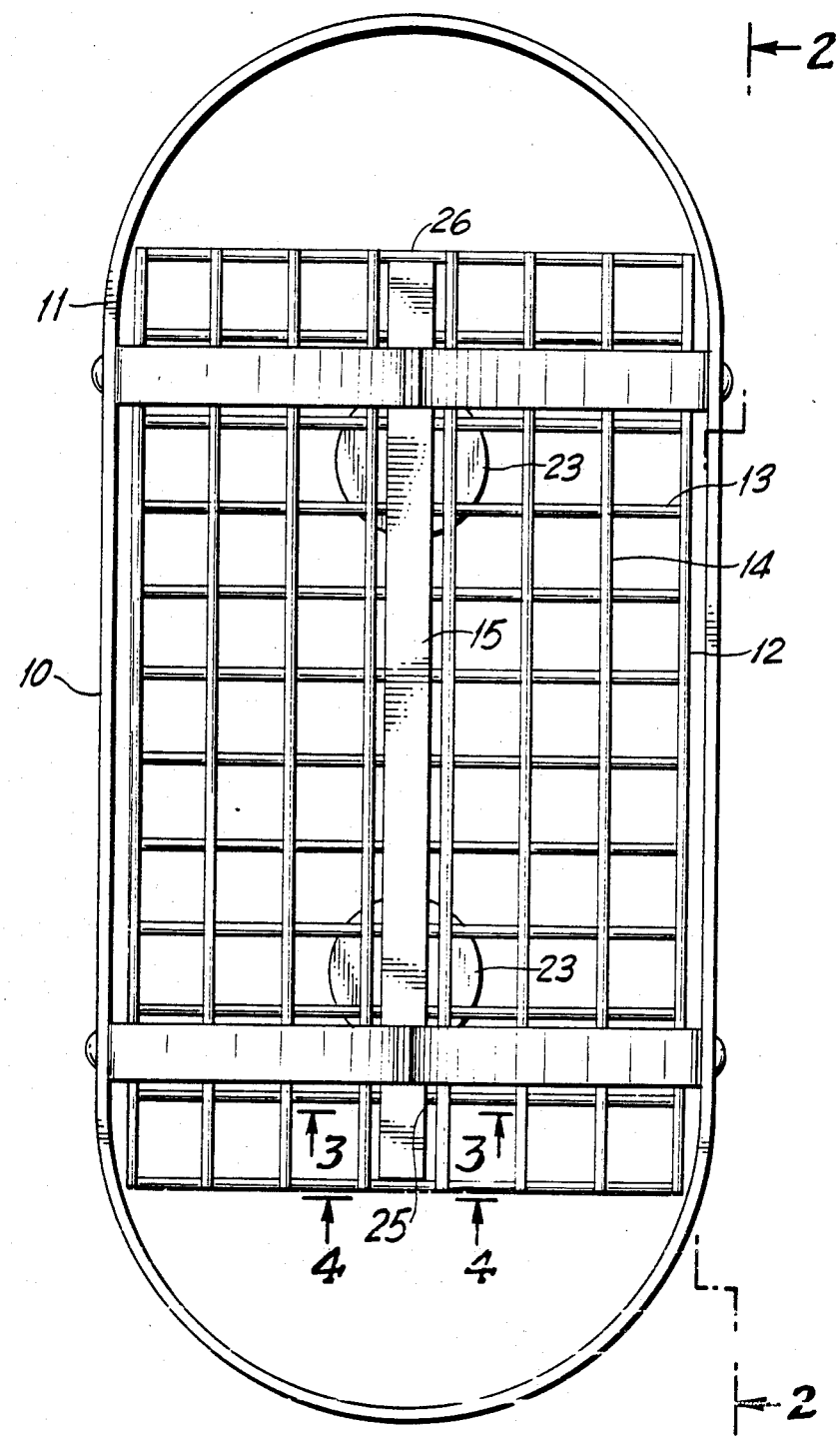
FIG. 1 is a top plan view of a fixture embodying the present invention.

Referring to the drawings, the fixture of the present invention is generally represented at 10. It comprises a suspendable structure including an outer, racetrack-shaped element 11 which may be constructed of stainless steel and may have, for example, a total length on the order of 4 feet and a width on the order of 2½ feet. Element 11 in cross-section may be 4 inches high and 1/16 inch in thickness. Appropriately attached to element 11, as for example by bolts, is a regular grid assembly generally designated as 12. The grid members may also be constructed of stainless steel, and may have cross-sections of, for example, ¼ inch by ¼ inch. The individual members of the first set of grid members 13 and the individual members of the second set of grid members 14 intersect each other in a regular manner, for example, at 90 degree angles, to form a regular array of grid openings.

A light track 15 having a roughly C-shaped cross-section rests on the grid, with the open portion of the C facing downward, and is positioned along the major axis of the suspendable structure. The grid is arranged such that the track lies along the midpoints of a series of grid openings. Lights, often called cans, for attachment to the track are generally composed of two parts—an attachment end and a light end. The attachment end, shown for example at 20, is attached to the track by inserting the free end into the open portion of the track and then rotating the entire light 90 degrees to lock the end into the open portion of the track. Details of the attachment mechanism are well known to those skilled in the art.

It is a critical aspect of the invention that the openings in the grid be sufficiently large to permit the attachment end of the track to rotate 90 degrees after being inserted into the track without abutting any grid members.

To prevent the track 15 from slipping in either direction from its desired position along the major axis of the suspended structure and along the centerline of a series of grid openings, spacers 25 can be positioned on selected spaced grid members, forming guides or supports for the light track 15. In addition, at both ends of the structure along its major axis, similar but longer elements such as element 26 shown in FIGS. 1 and 2 can be used to insure that the track does not slide out of position along the major axis.

Figure 2:
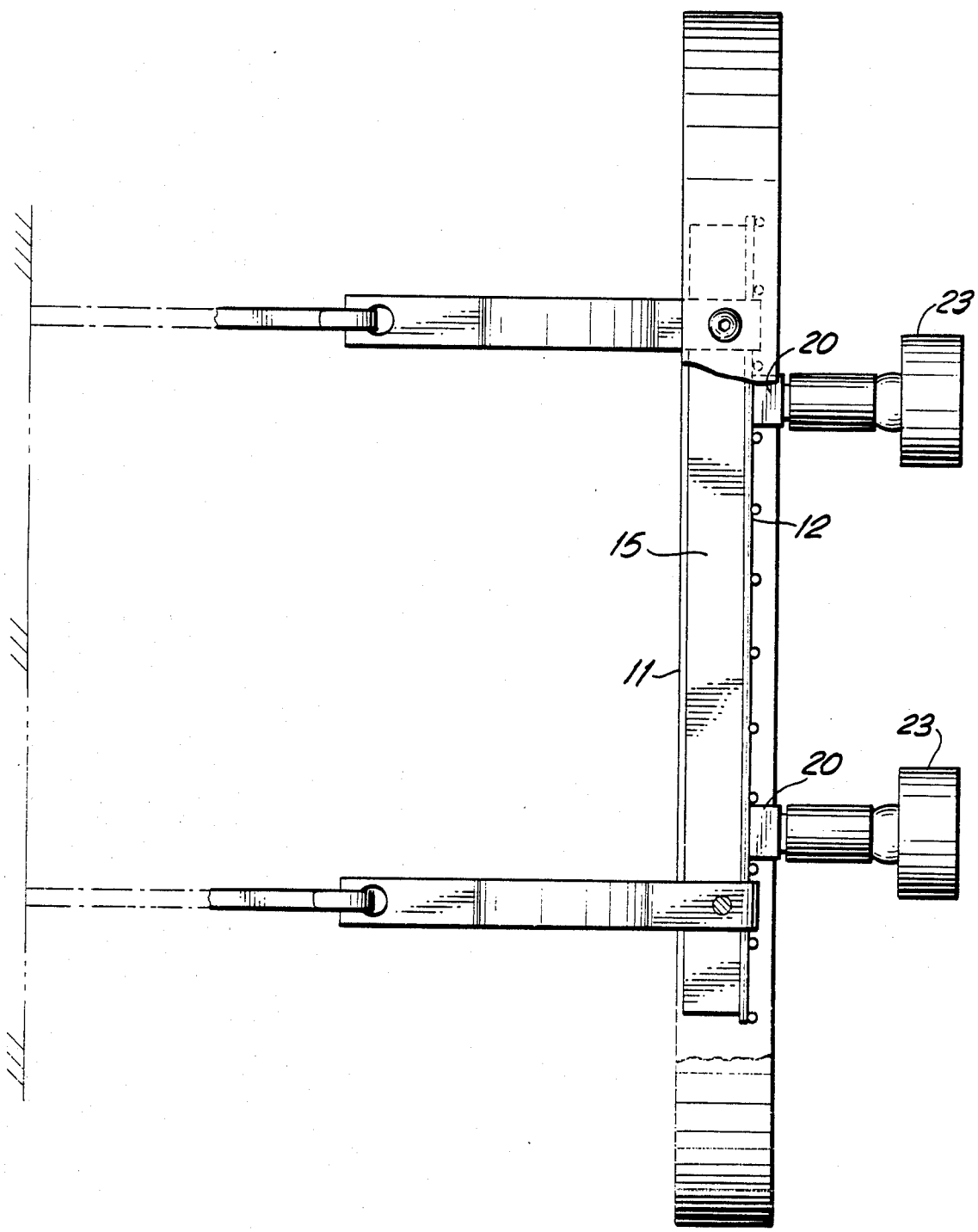
FIG. 2 is a side cutaway view taken across the line 2—2 in FIG. 1.
Figure 3:
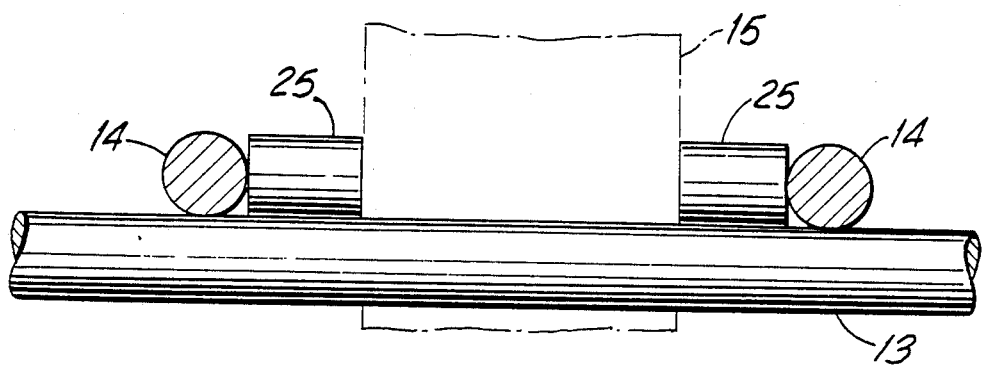
FIG. 3 is a cutaway view taken across the line 3—3 in FIG. 1.
Figure 4:
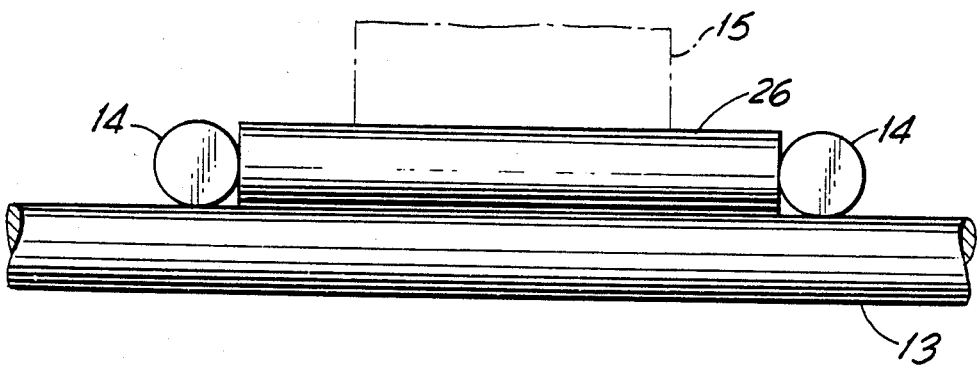
FIG. 4 is a cutaway view taken across the line 4—4 in FIG. 1.
Figure 5:
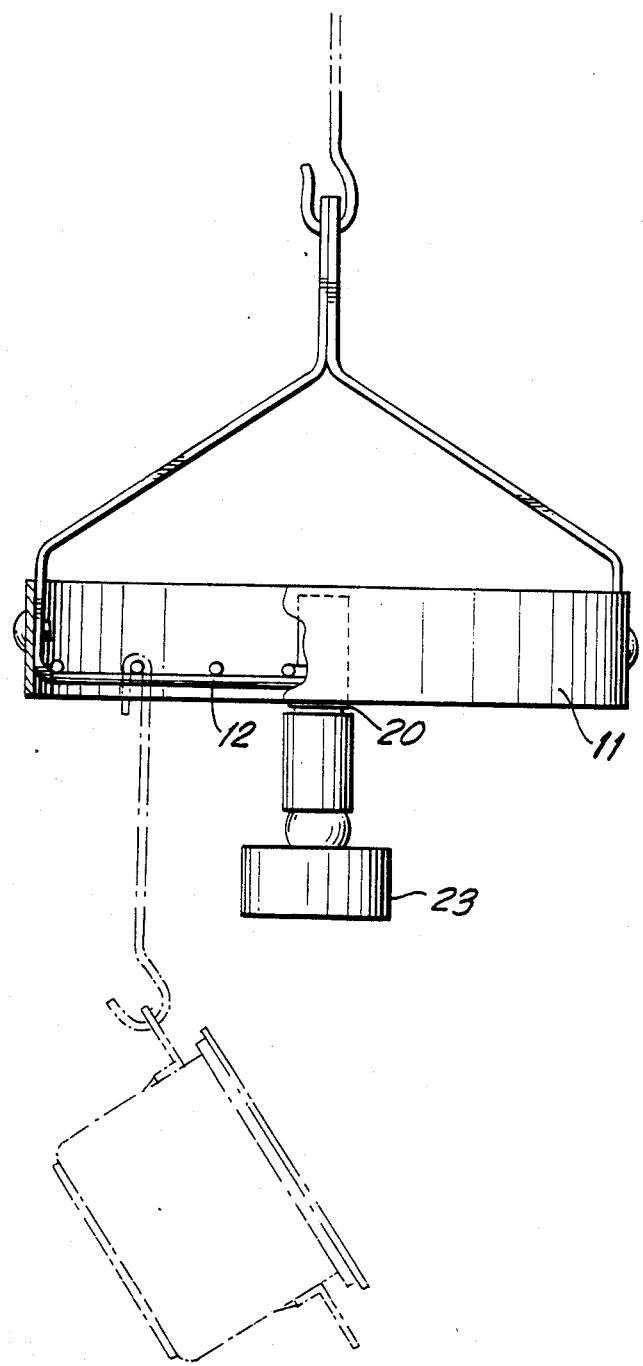
FIG. 5 is a front perspective view of the fixture shown in FIG. 1, also including two attached lights and three hanging kitchen utensils.

As is best seen in FIGS. 2 and 5, once the light track has been installed in the fixture and the entire fixture has been suitably suspended over a work area, light cans 23 can be installed at any desired location along the major axis by simply inserting a can up through a grid opening and, after its attachment end has been inserted into the track, rotating the can 90 degrees to lock it in place. Once the lights have been mounted, kitchen utensils can be hung from the structure as shown in FIG. 5. Because of the overall structure disclosed herein, utensils can be hung from the potrack yet lights can also be positioned advantageously from the same assembly.

I claim:

1. A fixture comprising:
   (a) an elongated, suspendable structure having a racetrack shape for holding kitchen utensils above a work surface, the structure comprising a regular grid;
   (b) a light track having a roughly C-shaped cross section resting on the grid and positioned along the major axis of the suspendable structure with the open portion of the track facing downwardly;
   (c) the grid elements being arranged symmetrically within the structure such that the major axis of the structure lies along the midpoint of a series of grid openings;
   (d) a plurality of light cans, each can comprising a light end and an attachment end, the attachment end being adapted to mate with the track, after insertion of its free end into the track, by a 90 degree rotation thereof;
   (e) each grid opening being sufficiently large to permit insertion of the attachment end of a light can upwardly through the grid openings into the downward-facing open portion of the light track.

2. The fixture of claim 1 further including a plurality of track supports mounted on selected grid members.